United States Patent [19]

Ballheimer et al.

[11] Patent Number: 5,040,454

[45] Date of Patent: Aug. 20, 1991

[54] PISTON ASSEMBLY AND PISTON MEMBER THEREOF HAVING A PREDETERMINED COMPRESSION HEIGHT TO DIAMETER RATIO

[75] Inventors: Benny Ballheimer; Stephen G. Shoup, both of Peoria, Ill.

[73] Assignee: Caterpillar Inc., Peoria, Ill.

[21] Appl. No.: 644,854

[22] Filed: Jan. 22, 1991

Related U.S. Application Data

[63] Continuation of Ser. No. 545,687, Jul. 2, 1990, abandoned, which is a continuation of Ser. No. 455,859, Dec. 15, 1989, abandoned, which is a continuation of Ser. No. 261,459, Oct. 21, 1988, abandoned.

[51] Int. Cl.$^5$ ..................................... F16J 1/00

[52] U.S. Cl. ..................................... 92/177; 92/186; 92/189; 92/190; 92/216; 92/219; 92/233; 123/193 P; 29/888.04; 29/888.042

[58] Field of Search ................ 92/173, 174, 177, 186, 92/187, 189, 190, 233, 176, 179, 208, 216, 219; 123/193 P; 29/DIG. 4, DIG. 18, 888.04, 888.042

[56] References Cited

U.S. PATENT DOCUMENTS

| | | | |
|---|---|---|---|
| 2,296,478 | 9/1942 | Morgan | 309/15 |
| 4,644,853 | 2/1987 | Russell et al. | 92/190 |
| 4,648,309 | 3/1987 | Schellmann | 92/177 |

(List continued on next page.)

FOREIGN PATENT DOCUMENTS

| | | | |
|---|---|---|---|
| 2039667 | 8/1980 | European Pat. Off. | 123/193 P |
| 0106935 | 5/1984 | European Pat. Off. . | |
| 0243530 | 3/1987 | Fed. Rep. of Germany | 123/193 D |
| 3210771 | 7/1988 | Fed. Rep. of Germany . | |
| 3742616 | 7/1988 | Fed. Rep. of Germany . | |
| 4793779 | 4/1979 | Japan . | |
| 0005455 | 1/1983 | Japan | 123/193 P |
| 0072653 | 4/1983 | Japan | 123/193 P |
| 0601500 | 4/1978 | U.S.S.R. | 123/193 P |

OTHER PUBLICATIONS

Technical Paper; Mahle Colloquium, p. 10, Date: May 1977.

Technical Paper; Mahle Piston Manual, pp. 1–15, Date: 1979 Edition.

Technical Paper; Proc. Instn. Mech. Engrs., pp. 181–196, Title: "The Design and Development of Piston for Automobile Engines", Date; 1964–65, vol. 179 2.1, No. 6, By: J.·E. Robinson.

Technical Paper; Mahle Symposium (pp. 3; 77–89) dated May 1973, by H. G. Braendel.

Technical Paper; Associated Engrg. Group Technical Symposium, Paper No. 7, Title: "Oil Cooled & Electron Beam Welded Pistons for Diesel Engs.", dated 5/1978, by Dr. R. Monro et al.

Technical Paper No. 780781; Society of Automotive Engineers, dated Sep. 11–14, 1978, by M. D. Roehrle.

Technical Paper No. 770031; Society of Automotive Engineers, dated Feb. 28–Mar. 4, 1977, by M. D. Roehrle.

*Primary Examiner*—John T. Kwon
*Assistant Examiner*—Thomas Denion
*Attorney, Agent, or Firm*—Larry G. Cain

[57] ABSTRACT

Present day diesel engines having aluminum piston assemblies are limited to combustion chamber pressures of approximately 12,410 kPa (1,800 psi) whereas the desire is to increase such pressures up to the 15,170 kPa (2,200 psi) range. To reach such levels the instant piston assembly includes a steel piston member having an upper cylindrical portion of a diameter "D" and a compression height "CH". The ratio of the compression height "CH" to the diameter "D" being within the range of from 60% to 45%. The piston member is preferably forged and subsequently machined to precisely controllable dimensions. Moreover, the piston assembly is preferably of the articulated type and includes a forged aluminum piston skirt connected to the piston member through a common wrist pin. Engine manufacturers are also demanding a smaller engine package size while retaining power output, improve fuel consumption and decreased emissions. The subject piston member provides a simple and inexpensive solution to the increased power output package size relationship. To insure a small engine package, the piston member has a compression height to maximum diameter ratio within the range of from 60% to 45%. The piston member is preferably made from a steel forging to insure a reduced porosity over that of existing standard castings.

27 Claims, 4 Drawing Sheets

U.S. PATENT DOCUMENTS

| | | | |
|---|---|---|---|
| 4,662,047 | 5/1987 | Berchem | 29/156.5 R |
| 4,704,950 | 11/1987 | Ripberger et al. | 92/208 |
| 4,727,795 | 3/1988 | Murray et al. | 123/193 P |
| 4,756,241 | 7/1988 | Sakurahara et al. | 123/193 P |
| 2,308,178 | 1/1943 | Kishline | 309/15 |
| 2,407,429 | 9/1946 | Kuttner | 309/6 |
| 3,971,355 | 7/1976 | Kottmann | 123/197 |
| 4,056,044 | 11/1977 | Kamman et al. | 92/159 |
| 4,129,108 | 12/1978 | Elsbett et al. | 123/193 |
| 4,180,027 | 12/1979 | Taylor | 92/186 |
| 4,207,808 | 6/1980 | Elsbett et al. | 92/158 |
| 4,269,083 | 5/1981 | Wandel | 92/158 |
| 4,286,505 | 9/1981 | Amdall | 92/186 |
| 4,356,800 | 11/1982 | Moebus | 123/193 P |
| 4,368,697 | 1/1983 | Moebus | 123/193 P |
| 4,377,967 | 3/1983 | Pelizzoni | 92/186 |
| 4,517,930 | 5/1985 | Nakano et al. | 123/193 P |
| 4,532,686 | 8/1985 | Berchem | 123/193 P |
| 4,577,595 | 3/1986 | Deutschmann et al. | 123/41.35 |
| 4,581,983 | 4/1986 | Moebus | 92/186 |
| 4,638,769 | 1/1987 | Ballheimer | 123/41.84 |

PISTON ASSEMBLY AND PISTON MEMBER THEREOF HAVING A PREDETERMINED COMPRESSION HEIGHT TO DIAMETER RATIO

This is a continuation of Ser. No. 07/545,687, filed July 2, 1990, now abandoned, which is a continuation of application Ser. No. 07/455,859, filed Dec. 15, 1989, now abandoned, which is a continuation of application Ser. No. 07/261,459, filed Oct. 21, 1988, now abandoned.

DESCRIPTION

1. Technical Field

This invention relates generally to a compact engine piston assembly for a high output internal combustion engine, and more particularly to a piston assembly including a steel piston member capable of resisting relatively high combustion chamber pressures and temperatures.

2. Background Art

The last several years has seen an increasing emphasis placed on vehicle fuel economy, reduced emissions and increased engine power output. This emphasis has also led to the reduction in vehicle and engine package size.

As present day engines which operate with combustion chamber pressures up to about 12,410 kPa (1800 psi) are converted to higher output engines the piston configuration experiences higher combustion chamber pressures and thermal temperatures. The cooled composite piston disclosed in U.S. Pat. No. 4,581,983 issued to Horst Moebus on Apr. 15, 1986, is an attempt to provide a piston that will withstand such increased pressures and temperatures. However, the upper and lower parts of the Moebus piston are joined together by welding, which is a costly process that preferably is to be avoided.

A more desirable construction to overcome the high combustion chamber pressure and thermal temperature is disclosed in U.S. Pat. No. 4,056,044 issued to Kenneth R. Kamman on Nov. 1, 1977. That above mentioned patent teaches the use of a complex two-piece articulated piston assembly. However, it has been found through experimentation that present technology cast piston members will not provide the high strength, factor of safety, and the long life which are required in todays high combustion chamber pressure engines without excessive quality control restraints. Extensive testing thereof has indicated that the practical level of knowledge on casting procedures is insufficient to resist combustion pressures above about 13,790 kPa (2,000 psi). Specifically, an excessive number of the upper cast steel piston members had so much porosity that premature failure resulted in experimental tests. On the other hand, a few cast steel piston members were manufactured with relatively low levels of porosity so that they survived a relatively rigorous testing program. While extensive studies were conducted to minimize porosity levels in the cast members, from a practical standpoint the levels remain too high. Accordingly, for quality control purposes it has been found necessary to X-ray each piston member thoroughly, and this is simply too costly to do.

Secondly, the benefit of grain flow with a cast piston is negligible and adds little if any structural strength to the piston. The increased combustion chamber pressure and thermal temperature cause pistons of this type to fail causing damage to the engine and downtime of the vehicle.

U.S. Pat. No. 4,662,047 issued to Rutger Berchem on May 5, 1987, discloses a one-piece piston produced by die pressing of a previously forged blank to bend an annular cylindrical collar thereon. However, the patent fails to teach or suggest a relative low ratio of the compression height to the piston diameter, the application thereof in conjunction with an articulated piston, or its used in a high combustion chamber pressure engine.

The U.S. Pat. No. 4,704,950 issued to Emil Ripberger et al. on Nov. 10, 1987, teaches the use of a single piece, extremely light and low friction non-articulated piston having a ratio of the compression height to the piston diameter of from 0.20 to 0.35. The range as taught by this patent fails to be acceptable when used with a high combustion chamber pressure engine due to the lack of sufficient structural integrity. For example, analytical data has shown that the portion carrying the rings could not withstand the loads and would structurally fail.

In addition to porosity considerations, it should be appreciated that the structural shape and strength of each element of an articulated piston is in a continual stage of being modified to better resist higher compressive loads, thermally induced forces and contain costs. For example, Society of Automotive Engineers, Inc., Paper No. 770031 authored by M. D. Roehle, entitled "Pistons for High Output Diesel Engines", and presented circa Feb. 28, 1977, is indicative of the great number of laboratory tests conducted throughout the world on the individual elements. That paper also discusses a number of considerations to minimize cracking problems in light alloy or aluminum piston members resulting primarily from thermal constraints. One consideration involves the desirability of increasing the distance between the upper edge of the wrist pin bore to the underside of the crown to reduce stresses in the pin bore region. However, in marked contradiction, it is becoming more important to reduce the so-called critical height "CH" of the piston member, which is defined by the elevational distance between the top surface thereof and the central axis of the wrist pin in order to provide increased compactness or reduced engine package size and to lower overall costs.

Thus, what is needed is a high output engine piston assembly and piston member therefor which is capable of continuous and efficient operation at combustion chamber pressures above about 13,790 kPa (2,000 psi), and preferably in the region of about 15,170 kPa (2,200 psi). Furthermore, the piston member should be relatively easy to manufacture by having a configuration substantially devoid of complex shapes to allow the manufacturing thereof. Moreover, the upper portion of the piston member should preferably be as smooth and symmetrical as possible to avoid stress risers and/or differential thermal distortion thereof. And still further, the compressive height "CH" of the piston member should preferably be as small as structurally practical for maximizing compactness.

The present invention is directed to overcoming one or more of the problems as set forth above.

DISCLOSURE OF THE INVENTION

In one aspect of the present invention, a steel piston member for reciprocatable movement in a high combustion chamber pressure engine comprises an upper portion of substantially cylindrical shape and having a preestablished maximum diameter "D", a lower portion, a compression height "CH", and a preestablished ratio of the compression height "CH" to the preestablished maximum diameter "D". The upper portion has a peripheral top surface, a tubular wall depending from the top surface, an annular outwardly facing wall surface and an annular cooling recess. The lower portion includes a pair of depending pin bosses blendingly associated with the outwardly facing wall surfaces. The pin bosses individually define a wrist pin receiving bore aligned on a common axis. The compression height "CH" is defined by the elevational distance between the common axis and the top surface. The preestablished ratio of the compression height "CH" to the preselected maximum diameter"D" is within the range of from 60% to 45%.

In another aspect of the invention, an articulated piston assembly for reciprocatable movement in a high combustion chamber pressure engine comprises a steel piston member having an upper portion having a preestablished maximum diameter "D" and a lower portion, a compression height "CH", a preestablished ratio of the compression height "CH" to the preselected maximum diameter "D" being within the range of from 60% to 45%, a skirt and a wrist pin. The upper portion has a peripheral top surface, a tubular wall depending from the top surface, an annular outwardly facing wall surface and an annular cooling recess. The lower portion includes a pair of depending pin bosses blendingly associated with the outwardly facing wall surfaces. The pin bosses individually define a wrist pin receiving bore aligned on a common axis. The skirt is of generally or slightly elliptical shape. The skirt is slidably positioned on the lower portion and has a pair of wrist pin receiving bores aligned with the common axis. The wrist pin is slidably disposed in the pair of wrist pin receiving bores.

In another aspect of the invention, an articulated piston assembly is adapted for use in a high combustion chamber pressure engine having a combustion chamber pressure in excess of about 13,790 kPa (2000 psi) comprises a steel piston member having an upper portion having a preestablished maximum diameter "D" and a lower portion, a compression height "CH", a preestablished ratio of the compression height "CH" to the preselected maximum diameter "D" being within the range of from 60% to 45%, a skirt and a wrist pin. The upper portion has a peripheral top surface, a tubular wall depending from the top surface, an annular outwardly facing wall surface and an annular cooling recess. The lower portion includes a pair of depending pin bosses blendingly associated with the outwardly facing wall surfaces. The pin bosses individually define a wrist pin receiving bore aligned on a common axis. The skirt is of a generally or slightly elliptical shape and also has a pair of wrist pin receiving bores aligned with the common axis. The wrist pin is slidably disposed in the two pairs of wrist pin receiving bores.

In another aspect of the invention, an articulated piston assembly having a relative low compression height to diameter ratio adapted for use in a high combustion chamber pressure engine having a combustion chamber pressure of about 13,790 kPa (2000 psi) comprises a steel piston member having an upper portion and a lower portion which are integrally formed of steel, a skirt of slightly elliptical shape having a top surface in non-contacting relationship to the upper portion is slidably positioned about the lower portion and has a wrist pin slidably connecting the skirt to the piston member.

The present invention provides structural members which represent a simple, inexpensive, and lightweight solution to resist the increasing combustion pressures and combustion temperatures of todays and future engines.

BEST MODE FOR CARRYING OUT THE INVENTION

Figure 1:
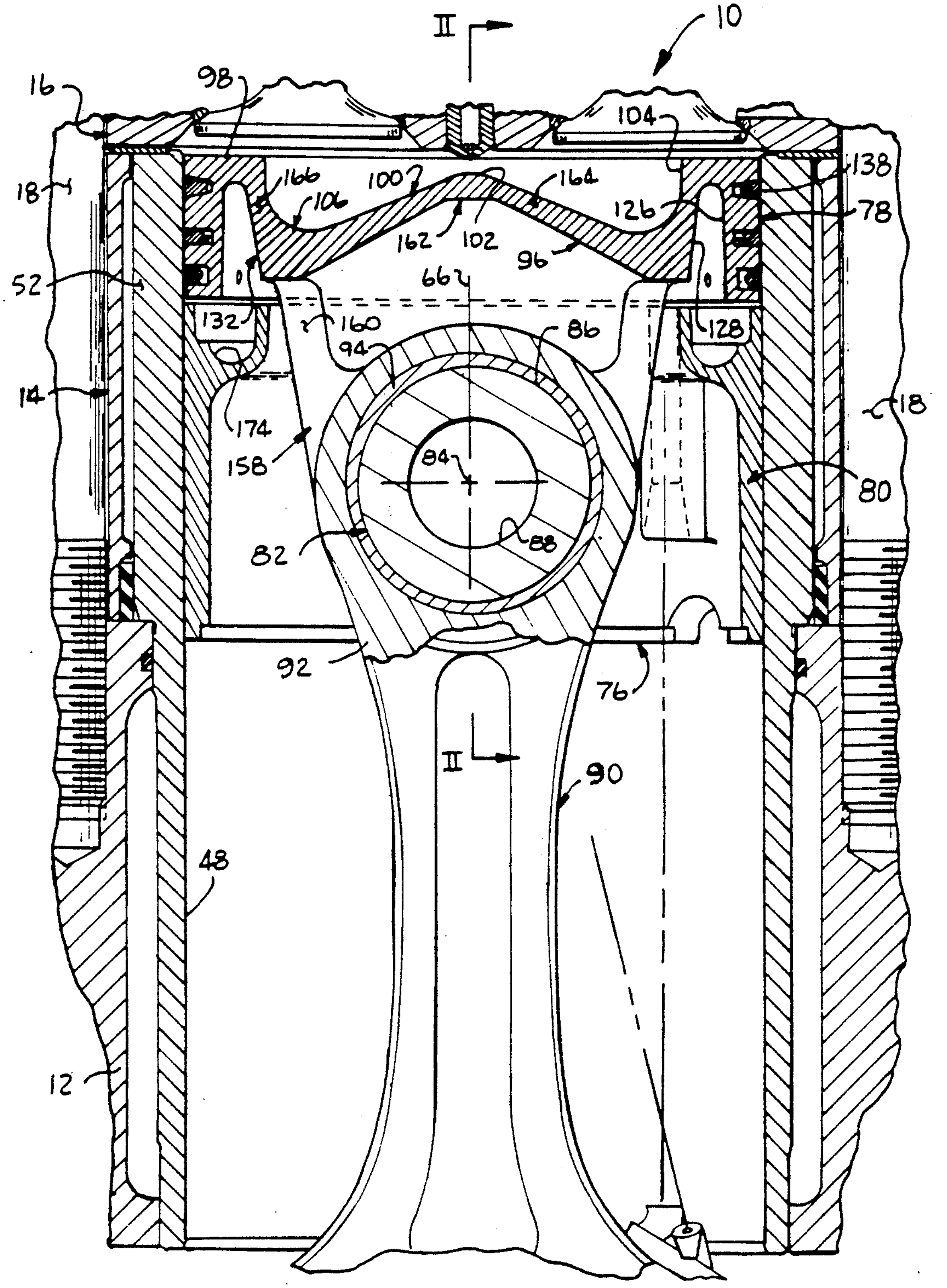
FIG. 1 is a diagrammatic, fragmentary, transverse vertical sectional view of an engine piston assembly constructed in accordance with the present invention.
Figure 2:
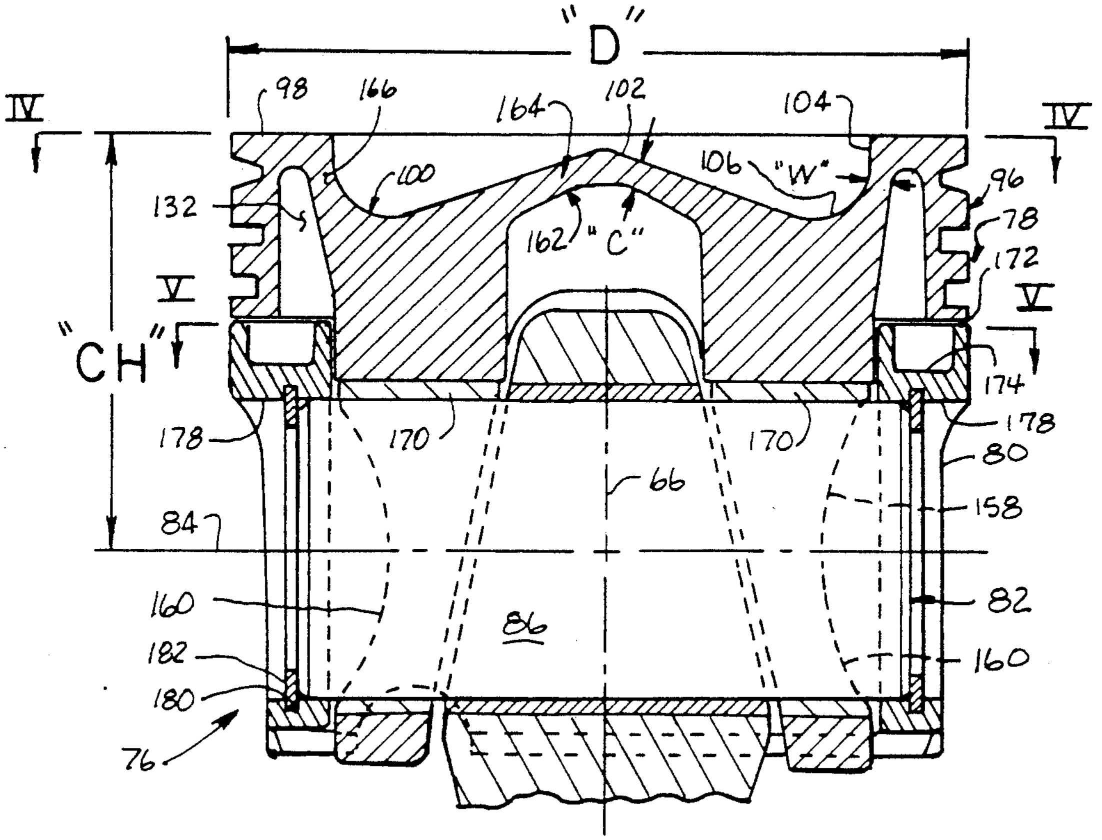
FIG. 2 is a longitudinal vertical sectional view of a portion of the piston assembly illustrated in FIG. 1 as taken along the line II—II thereof.

Referring now to FIGS. 1 and 2, an internal combustion engine 10 of the multi-cylinder type includes a bottom block 12, a top block or spacer portion 14, and a cylinder head 16 rigidly secured together in the usual way by a plurality of fasteners or bolts 18 which pass through the head and block and are screwthreadably received in the bottom block. A mid-supported cylinder liner 48 has an upper portion 52 positioned in the top block portion 14 and is provided with coolant flow therearound. The engine 10 could be of any conventional design.

The engine 10 further includes a cooling oil directing nozzle 74 as is shown in the lower right portion of FIG. 1. This nozzle is rigidly secured to the bottom block 12 and is operationally associated with a conventional source of pressurized oil, not shown, to supply oil or the like to an articulated piston assembly 76.

The piston assembly 76 of the engine 10 includes an upper steel piston member 78 and a lower aluminum piston skirt 80 which are rockably mounted on a common wrist pin or gudgeon pin 82 having a longitudinally oriented central axis 84. The wrist pin is also of steel material and has an external cylindrical surface 86, and a cylindrical bore 88 therethrough for weight reduction purposes. A conventional connecting rod 90 of a tepee configuration has an upper eye end 92, and a steel-backed bronze sleeve bearing 94 therein is operationally connected to, and driven by, the wrist pin.

The steel piston member 78 has an upper portion 96 of substantially cylindrical shape and a preselected maximum diameter "D" as is illustrated in FIG. 2. As an alternative, the upper portion 96 of the piston member 76 could be generally cylindrical or slightly elliptical.

The upper portion 96 has a peripheral top surface 98 that is flat, or is located on a plane perpendicular to the central axis 66, and a crown surface 100 that in the instant example is a fully machined surface of revolution about the central axis 66. In general, the crown surface has a centrally located apex portion 102 elevationally disposed below the top surface, a peripheral or radially outer land portion 104 that is substantially cylindrical and an annular trough 106 that smoothly blends with the apex and outer land portions. The combination of the apex portion 102, the annular trough 106 and the outer land portion 104 greatly improves combustion efficiency.

Figure 3:
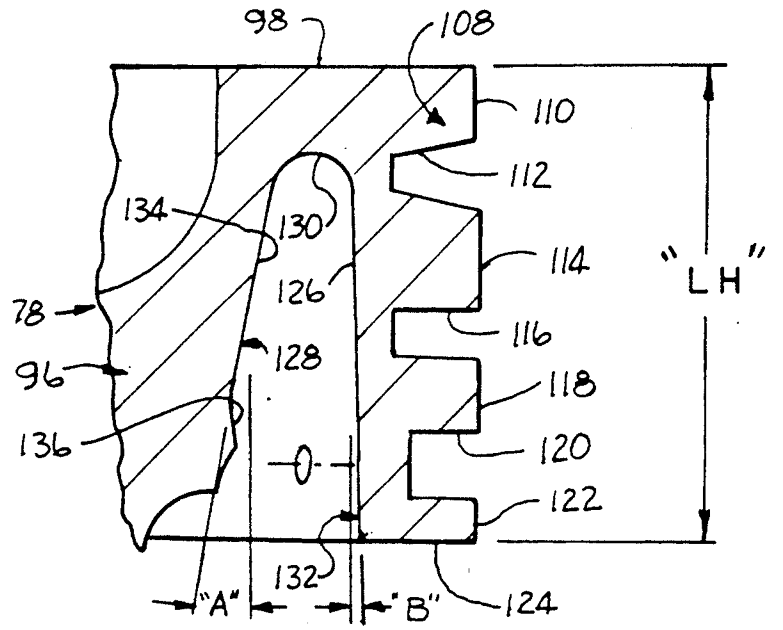
FIG. 3 is an enlarged fragmentary portion of the top peripheral region of the piston member shown in FIGS. 1 and 2 to better show details of construction thereof.
Figure 4:
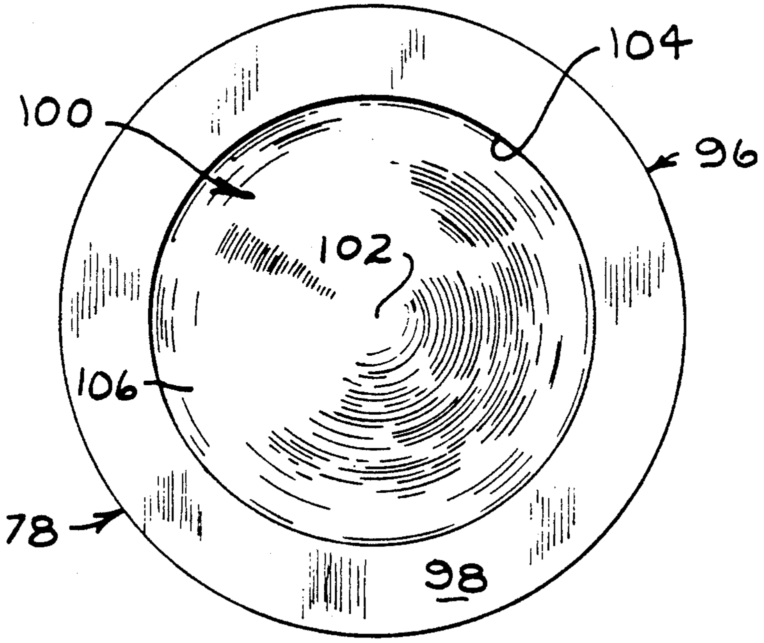
FIG. 4 is a top view of the piston member shown in FIG. 2 as taken along line IV—IV thereof.
Figure 5:
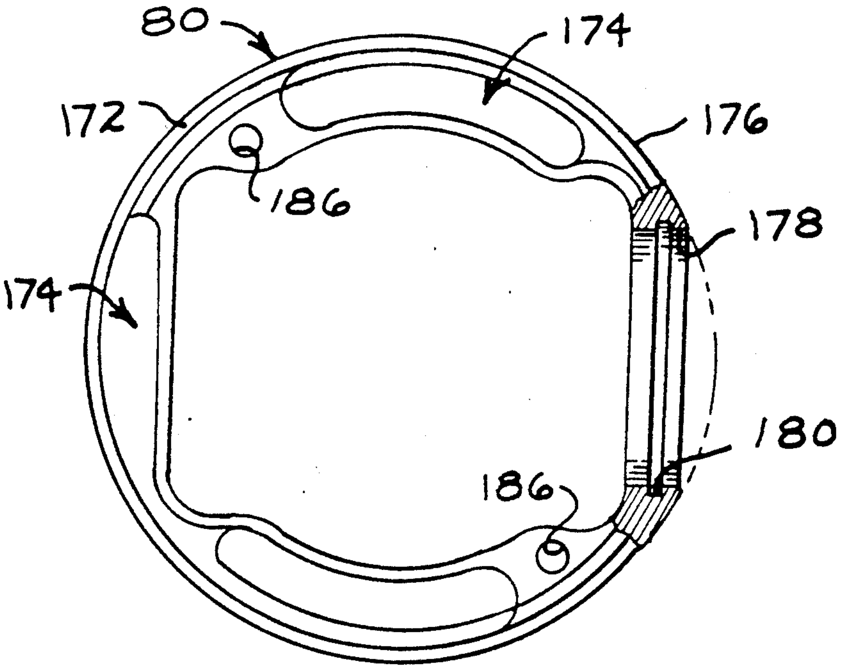
FIG. 5 is a top view solely of the piston skirt shown in FIG. 2 as taken along line V—V thereof.
Figure 6:
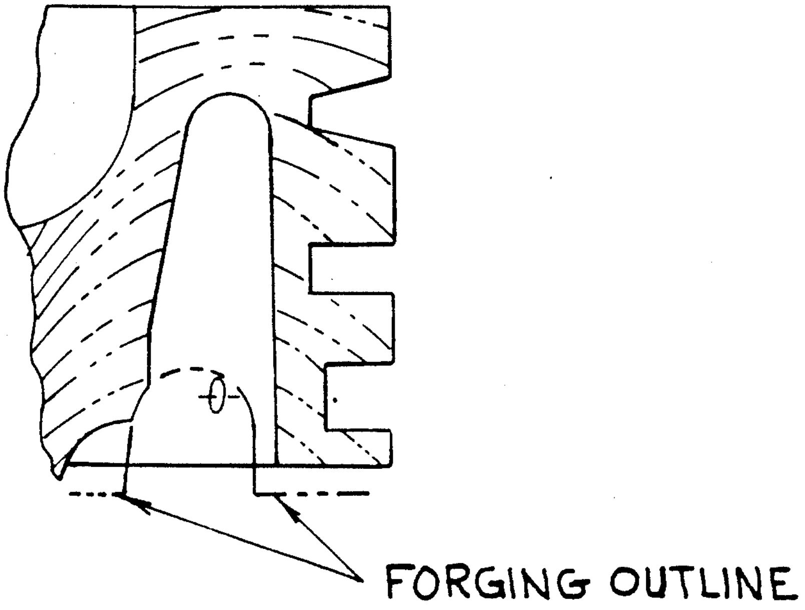
FIG. 6 an enlarged fragmentary cross sectional view of the top peripheral region of the piston member shown in FIGS. 1 and 2 which shows the flow lines of a simple forged piston member with only a portion of the cooling recess forged.
Figure 7:
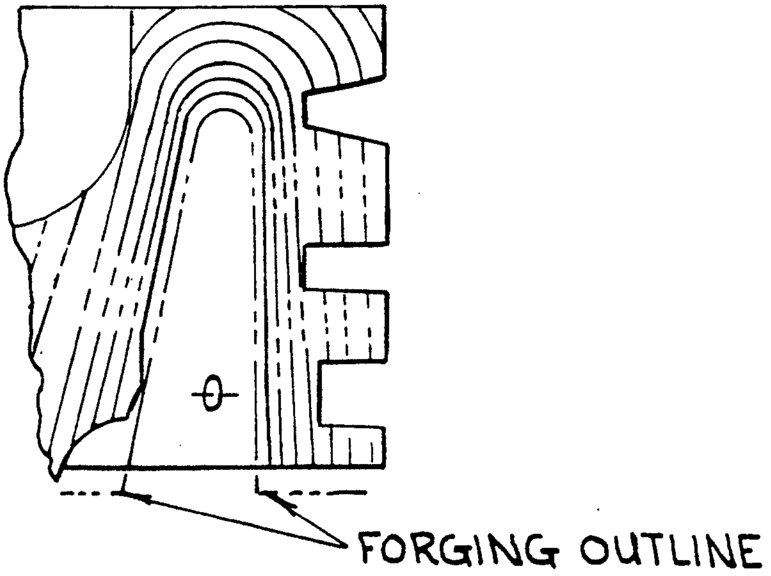
FIG. 7 is an enlarged fragmentary cross sectional view of the top peripheral region of the piston member shown in FIGS. 1 and 2 which shows the flow lines of a forged piston member with a deeply forged cooling recess.

As is shown best in FIG. 3, the piston member 78 further includes a tubular wall 108 that depends from the outer edge of the top surface 98 and defines in serially depending order fully around the periphery thereof a top land 110, a top ring groove 112 having a keystone or wedge-like shape in cross section, an upper intermediate land 114, an intermediate ring groove 116 of rectangular cross section, a lower intermediate land 118, a bottom ring groove 120 of rectangular cross section, and a bottom land 122 that is terminated by a lower end surface 124. An annular radially inwardly facing wall surface 126 is also delineated by the wall 108 and extends upwardly from the end surface 124. The upper portion 96 is additionally defined by an annular radially outwardly facing wall surface 128 and a downwardly facing transition portion 130 that is blendingly associated with the wall surfaces 126 and 128 to collectively define an annular cooling recess 132 of a precisely defined cross sectional shape. In actuality, the wall surface 128 is defined by an upper fully conical portion 134 having an inclination angle "A" with respect to the central axis 66 of approximately 12 degrees as is shown in FIG. 3, and a fully cylindrical portion 136 below it. On the other hand the wall surface 126 is fully conical and has an inclination angle "B" of approximately 1.7 degrees. As an alternative, the annular cooling recess 132 could be of any configuration to be forged such as the shallow recess shown in FIG. 6 or as an alternative the deep recess as shown in FIG. 7. As further shown in FIGS. 6 and 7, the grain flow obtained with a forging are shown by use of phantom lines.

The steel piston member 78 further includes a lower portion 158 including a pair of depending pin bosses 160 blendingly associated with the outwardly facing wall surface 128 of the upper portion 96, and blendingly associated also with a downwardly facing concave pocket 162 defined by the upper portion. The concave pocket is spaced substantially uniformly away from the apex portion 102 of the crown surface 100 so as to define a crown 164 of generally uniform thickness "C" of about 4 or 5 mm as is shown in FIGS. 2 and 3. Moreover, these figures also illustrate and define a relatively thin and substantially conically oriented web 166 of a minimum thickness "W" of about 4 to 7 mm between the trough 106 and juxtaposed land portion 104 of the crown surface 100, and the outwardly facing wall surface 128. Each of the pin bosses 160 has a bore 168 therethrough which are adapted to individually receive a steel-backed bronze bearing sleeve 170 therein. These bearing sleeves are axially aligned to receive the wrist pin 82 pivotally therein.

Referring now to the piston skirt 80, it has a top peripheral surface 172 in close non-contacting relationship with the lower end surface 124 of the upper portion 96 of the piston member 78 with a fully annular, upwardly facing oil trough 174 defined therein. It further has a slightly elliptical external surface 176 therearound which depends from the top surface. The skirt 80 further has a maximum diameter 177 and a minimum diameter 177*a*. A pair of aligned wrist pin receiving bores 178 are formed through the piston skirt and are axially aligned with the minimum diameter 177*a*, and each of the bores has a snap ring receiving groove 180 therein. The piston skirt is thus pivotally mounted on the wrist pin 82 which is slidably insertably positioned in both bores. Excessive movement of the wrist pin is prevented along the axis 84 by a pair of split retaining rings 182 individually disposed in the grooves 180.

A pair of axially oriented bosses 184 are defined within the skirt 80 so that a corresponding pair of lubrication passages 186 can be provided fully axially therethrough. The lubrication passages are positioned diagonally opposite each other so that the skirt can be mounted on the wrist pin 82 in either of the two possible positions, and so at least one of them will be axially aligned with the oil jet nozzle 74. The skirt is also provided with diagonally opposite, semi-cylindrical recesses 188 which open downwardly at the bottom of the skirt to provide clearance from the nozzle when the skirt is reciprocated to its lowest elevational position.

Industrial Applicability

The steel piston member 78 in this application is used with an articulated piston assembly 76. The articulated piston assembly is used in a high combustion chamber pressure engine 10 having a combustion chamber pressure of 15,170 kPa (2200 psi). The articulated piston assembly 76 allows the power output to be increased and reduces the engine package size. As shown in FIG. 1, the articulated piston assembly 76 is used with an engine 10 having a mid-supported cylinder liner 48 and a two piece cylinder block 12,14 construction. Liquid cooling is positioned in only the top block 14 of the two piece block and provides excellent cooling or heat dissipation for the piston assembly.

In operation, the articulated piston assembly 76 reciprocates downwardly to bottom dead center whereupon the nozzle 74 directs lubricating oil into the skirt passage 186 aligned therewith. The oil jet continues upwardly whereupon it makes contact with the surfaces of the cooling recess 132 of the piston member 78 and is splashed peripherally in opposite directions. A significant portion of the oil is caught by the skirt trough 174 as the piston assembly is reciprocated and further more evenly distributed around the interior of the piston member.

Referring to FIG. 3, it may be noted that the top of the cooling recess 132 is elevationally disposed directly underneath the peripheral top surface 98 of the piston member, and within an elevational distance therefrom identified by the letter "E" of about 5 mm. It has been concluded that the ratio of the distance "E" to the piston diameter "D" should be below about 0.10, and preferably should be between about 0.04 and 0.06. In one embodiment the diameter "D" was 124 mm, and the distance "E" was 5.5 mm which provides a ratio thereof of approximately 0.044.

In the same embodiment the elevational distance "CH" between the top surface 98 and the wrist pin axis 84 was 70 mm. Therefore, the ratio of "CH" to "D" was about 0.56. It was subsequently concluded that the ratio of "CH" to "D" should be below about 0.60, and preferably should be between about 0.60 and 0.45.

In addition to the dimensional constraints mentioned above, it is to be appreciated that the articulated piston assembly 76 is preferably manufactured in a particular way and by using certain materials. For example, the upper steel piston member 78 is preferably forged from an alloy steel which is basically 4140 modified steel.

The lower aluminum piston skirt 80 is likewise preferably forged from a modified aluminum which is basically SAE 321-T6 modified aluminum.

The aforementioned alloy steel is particularly adaptable to a Class II forging, and can provide an austenitic grain size 5 or finer which is highly desirable to resist the high combustion pressures associated with the high combustion chamber pressure engine. Thus, the grain flow, primarily in the web 166, as shown in FIGS. 6 and 7, and grain size allows the forces to be resisted or transmitted and provides the high strength, factor of safety and long life which is required in todays high combustion chamber pressure engines.

The aforementioned forged aluminum alloy has a high hardness, excellent wear resistance, and a relatively low coefficient of thermal expansion.

We claim:

1. An articulated piston assembly adapted for use in a high combustion chamber pressure engine having a combustion chamber pressure in excess of about 13,790 kPa (2000 psi) comprising:

a steel piston member having an upper portion and a lower portion;

the upper portion being substantially cylindrical in shape and having a preestablished maximum diameter "D", a peripheral top surface, a tubular wall depending from the top surface, an annular outwardly facing wall surface and a downwardly facing annular cooling recess;

the lower portion including a pair of depending pin bosses blendingly associated with the outwardly facing wall surface, said pin bosses individually defining a wrist pin receiving bore aligned on a common axis;

a compression height "CH" defined by the elevational distance between the common axis and the top surface;

a preestablished ratio of the compression height "CH" to the preselected maximum diameter "D" being within the range of from 60% to 45%;

a skirt of generally or slightly elliptical shape slidably positioned on the lower portion and having a pair of wrist pin receiving bores aligned with the common axis; and a wrist pin slidably disposed in the pair of wrist pin receiving bores.

2. The piston member of claim 1 wherein said upper portion and lower portion are an integrally formed forging.

3. The piston member of claim 1 wherein said annular cooling recess is located elevationally beneath the top surface.

4. The piston member of claim 1 wherein said upper portion has a crown surface.

5. The piston member of claim 4 wherein said crown surface has an centrally located apex portion and an annular trough blending therewith.

6. An articulated piston assembly for reciprocatable movement in a high combustion chamber pressure engine comprising:

a steel piston member having an upper portion and a lower portion;

the upper portion being generally cylindrical in shape and having a preestablished maximum diameter "D", a peripheral top surface, a tubular wall depending from the top surface, an annular outwardly facing wall surface and a downwardly facing annular cooling recess;

the lower portion including a pair of depending pin bosses blendingly associated with the outwardly facing wall surface, said pin bosses individually defining a wrist pin receiving bore aligned on a common axis;

a compression height "CH" defined by the elevational distance between the common axis and the top surface;

a preestablished ratio of the compression height "CH" to the preselected maximum diameter "D" being within the range of from 60% to 45%;

a skirt positioned about the lower portion and having a pair of wrist pin receiving bores aligned with the common axis; and a wrist pin slidably disposed in the pair of wrist pin receiving bores of the skirt and the lower portion.

7. The piston assembly of claim 6 wherein said upper portion and lower portion are an integrally formed steel forging.

8. The piston assembly of claim 6 wherein said annular cooling recess is located elevationally beneath the top surface.

9. The piston assembly of claim 7 wherein said upper portion has a crown.

10. The piston assembly of claim 9 wherein said crown surface has a centrally located apex portion and an annular trough blending therewith.

11. The piston assembly of claim 6 wherein said skirt is generally or slightly elliptical shaped.

12. An articulated piston assembly for reciprocatable movement in a high combustion chamber pressure engine comprising:

a steel piston member having an upper portion and a lower portion;

the upper portion being substantially cylindrical in shape and having a preestablished maximum diameter "D", a peripheral top surface, a tubular wall depending from the top surface, an annular outwardly facing wall surface and a downwardly facing annular cooling recess;

the lower portion including a pair of depending pin bosses blendingly associated with the outwardly facing wall surface, said pin bosses individually defining a wrist pin receiving bore aligned on a common axis;

a compression height "CH" defined by the elevational distance between the common axis and the top surface;

a preestablished ratio of the compression height "CH" to the preselected maximum diameter "D" being within the range of from 60% to 45%;

a skirt having a generally or slightly elliptical shape, being positioned about the lower portion and having a pair of wrist pin receiving bores aligned with the common axis, said shape has a maximum diameter and a minimum diameter and said pair of wrist pin receiving bores are positioned in alignment with the minimum diameter; and a wrist pin slidably disposed in the pair of wrist pin receiving bores of the skirt and the lower portion.

13. The piston assembly of claim 12 wherein said skirt further has a top surface in close non-contacting relationship with the lower end surface of the upper portion.

14. The piston assembly of claim 13 wherein said skirt further has a generally annular trough in the top surface and a pair of passages for communicating a cooling fluid thereto.

15. The piston assembly of claim 14 wherein said trough stores the cooling fluid and splashes it during reciprocation of the piston assembly against the recess.

16. The piston assembly of claim 15 wherein each of said pair of wrist pin receiving bores forms an inner surface and each of the surfaces has an annular ring groove therein.

17. The piston assembly of claim 16 further includes a snap rings positioned in each of the grooves in order to retain the wrist pin therebetween.

18. An articulated piston assembly for reciprocatable movement in a high compression chamber pressure engine comprising:

a steel piston member having an upper portion and a lower portion;

the upper portion being generally cylindrical in shape and having a preestablished maximum diameter "D", a peripheral top surface, a tubular wall depending from the top surface, an annular outwardly facing wall surface and a downwardly facing annular cooling recess;

the lower portion including a pair of depending pin bosses blendingly associated with the outwardly facing wall surface, said pin bosses individually defining a wrist pin receiving bore aligned on a common axis;

a compression height "CH" defined by the elevational distance between the common axis and the top surface;

a preestablished ratio of the compression height "CH" to the preselected maximum diameter "D" being within the range of from 60% to 45%;

a skirt having a generally or slightly elliptical shape, being positioned about the lower portion and having a pair of wrist pin receiving bores aligned with the common axis, said shape has a maximum diameter and a minimum diameter and said pair of wrist pin receiving bores are positioned in alignment with the minimum diameter; and a wrist pin slidably disposed in the pairs of wrist pin receiving bores of the skirt and the lower portion.

19. The articulated piston assembly of claim 18 wherein said upper portion and lower portion are an integrally formed steel forging.

20. The articulated piston assembly of claim 18 wherein said annular cooling recess is located elevationally beneath the top surface.

21. The articulated piston assembly of claim 20 wherein said upper portion has a crown surface.

22. The articulated piston assembly of claim 21 wherein said crown surface has a centrally located apex portion and an annular trough blending therewith.

23. The articulated piston assembly of claim 18 wherein said skirt further has a top surface in close non-contacting relationship with the lower end surface of the upper portion.

24. The articulated piston assembly of claim 23 wherein said skirt further has a generally annular recess in the top surface and a pair of passages for communicating a cooling fluid thereto.

25. The articulated piston assembly of claim 24 wherein said recess stores the cooling fluid and splashes it during reciprocation of the piston assembly against the recess.

26. The articulated piston assembly of claim 25 wherein each of said pair of wrist pin receiving bores forms an inner surface and each of the surfaces has an annular ring groove therein.

27. The articulated piston assembly of claim 26 further includes a snap rings positioned in each of the grooves in order to retain the wrist pin therebetween.

* * * * *

UNITED STATES PATENT AND TRADEMARK OFFICE
CERTIFICATE OF CORRECTION

PATENT NO. : 5,040,454

DATED : August 20, 1991

INVENTOR(S) : Benny Ballheimer and Stephen G. Shoup

It is certified that error appears in the above-identified patent and that said Letters Patent is hereby corrected as shown below:

Claim 5, column 7, line 62, "an" (first occurrence) should be --a--.

Claim 12, column 8, line 41, "substantially" should be --generally--.

Signed and Sealed this

Seventh Day of April, 1992

*Attest:*

HARRY F. MANBECK, JR.

*Attesting Officer* *Commissioner of Patents and Trademarks*

US005040454C1

(12) EX PARTE REEXAMINATION CERTIFICATE (5298th)

United States Patent

Ballheimer et al.

(10) Number: US 5,040,454 C1

(45) Certificate Issued: Mar. 14, 2006

(54) PISTON ASSEMBLY AND PISTON MEMBER THEREOF HAVING A PREDETERMINED COMPRESSION HEIGHT TO DIAMETER RATIO

(75) Inventors: Benny Ballheimer, Peoria, IL (US); Stephen G. Shoup, Peoria, IL (US)

(73) Assignee: Caterpillar Inc., Peoria, IL (US)

Reexamination Request:
No. 90/005,236, Jan. 26, 1999

Reexamination Certificate for:

| | |
|---|---|
| Patent No.: | **5,040,454** |
| Issued: | **Aug. 20, 1991** |
| Appl. No.: | **07/644,854** |
| Filed: | **Jan. 22, 1991** |

Certificate of Correction issued Apr. 7, 1992.

Related U.S. Application Data

(63) Continuation of application No. 07/545,687, filed on Jul. 2, 1990, now abandoned, which is a continuation of application No. 07/455,859, filed on Dec. 15, 1989, now abandoned, which is a continuation of application No. 07/261,459, filed on Oct. 21, 1988, now abandoned.

(51) Int. Cl.
*F16J 1/10* (2006.01)

(52) U.S. Cl. ............................ 92/177; 92/186; 92/189; 92/190; 92/216; 92/219; 92/233; 123/193 P; 29/888.04; 29/888.042

(58) Field of Classification Search .................. 92/173, 92/174, 177, 186, 189, 190, 187, 233, 176, 92/179, 208, 216, 219; 123/193 P; 29/DIG. 4, 29/DIG. 18, 888.04, 888.042
See application file for complete search history.

(56) References Cited

U.S. PATENT DOCUMENTS

| | | | |
|---|---|---|---|
| 2,296,478 | A | 9/1942 | Morgan |
| 2,308,178 | A | 1/1943 | Kishline |
| 2,407,429 | A | 9/1946 | Kuttner |

(Continued)

FOREIGN PATENT DOCUMENTS

| | | |
|---|---|---|
| DE | 3210771 | 7/1988 |
| DE | 3742616 | 7/1988 |
| EP | 0106935 | 5/1984 |
| GB | 366017 | 1/1932 |
| JP | 4793779 | 4/1979 |
| JP | 0005455 | 1/1983 |
| JP | 0072653 | 4/1983 |
| JP | 62-128143 | 8/1987 |
| SU | 0601500 | 4/1978 |

OTHER PUBLICATIONS

R. Munro, W.J. Griffiths, G.L. Allen, J. Travaille, A.E. Bolton, "Paper No. 6—Improved Piston Designs for Heavy Duty Diesel Applications," Partners in Progress, Technical Symposium 1986, Apr. 6–9, 1986, pp. 6.1–6.9.

(Continued)

*Primary Examiner*—Hoang Minh Nguyen

(57) ABSTRACT

Present day diesel engines having aluminum piston assemblies are limited to combustion chamber pressures of approximately 12,410 kPa (1,800 psi) whereas the desire is to increase such pressures up to the 15,170 kPa (2,200 psi) range. To reach such levels the instant piston assembly includes a steel piston member having an upper cylindrical portion of a diameter "D" and a compression height "CH". The ratio of the compression height "CH" to the diameter "D" being within the range of from 60% to 45%. The piston member is preferably forged and subsequently machined to precisely controllable dimensions. Moreover, the piston assembly is preferably of the articulated type and includes a forged aluminum piston skirt connected to the piston member through a common wrist pin. Engine manufacturers are also demanding a smaller engine package size while retaining power output, improve fuel consumption and decreased emissions. The subject piston member provides a simple and inexpensive solution to the increased power output package size relationship. To insure a small engine package, the piston member has a compression height to maximum diameter ratio within the range of from 60% to 45%. The piston member is preferably made from a steel forging to insure a reduced porosity over that of existing standard castings.

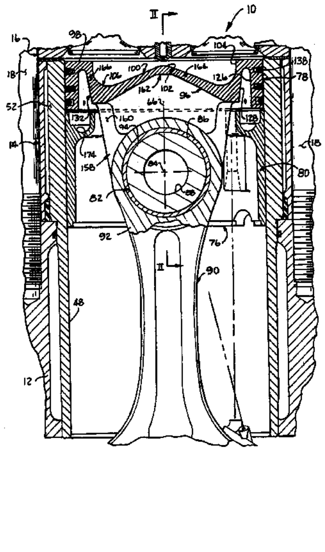

U.S. PATENT DOCUMENTS

| | | | | |
|---|---|---|---|---|
| 3,971,355 | A | | 7/1976 | Kottmann |
| 4,056,044 | A | | 11/1977 | Kamman et al. |
| 4,129,108 | A | | 12/1978 | Elsbett et al. |
| 4,180,027 | A | | 12/1979 | Taylor |
| 4,207,808 | A | | 6/1980 | Elsbett et al. |
| 4,269,083 | A | | 5/1981 | Wandel |
| 4,286,505 | A | | 9/1981 | Amdall |
| 4,356,800 | A | | 11/1982 | Moebus |
| 4,363,293 | A | * | 12/1982 | Munoz et al. ........... 123/41.38 |
| 4,368,697 | A | | 1/1983 | Moebus |
| 4,377,967 | A | | 3/1983 | Pelizzoni |
| 4,517,930 | A | | 5/1985 | Nakano et al. |
| 4,532,686 | A | | 8/1985 | Berchem |
| 4,577,595 | A | | 3/1986 | Deutschmann et al. |
| 4,581,983 | A | | 4/1986 | Moebus |
| 4,638,769 | A | | 1/1987 | Ballheimer |
| 4,644,853 | A | | 2/1987 | Russell et al. |
| 4,648,309 | A | | 3/1987 | Schellmann |
| 4,662,047 | A | | 5/1987 | Berchem |
| 4,704,950 | A | | 11/1987 | Ripberger |
| 4,727,795 | A | | 3/1988 | Murray et al. |
| 4,756,241 | A | | 7/1988 | Sakurahara |

OTHER PUBLICATIONS

R. Munro, R.A. Day, J.R. Parkin, "Paper No. 7—The Development of a Lightweight Steel Piston," Technical Symposium 1986, Apr. 6–9, 1986, pp. 7.1–7.5.

Bruce Wadman, "New Small Engine Family Caterpillar," Jul. 1986 Diesel Progress North American.

Drawing P–1678 AR/XO dated Aug. 24, 1984.

Report No. 216,041 dated Jan. 2, 1985.

April 1984 Proposal.

MAHLE Piston Manual 1985.

Technical Paper; Mahle Colloquium, p. 10, May 1977.

Technical Paper; Mahle Piston Manual, pp. 1–15, May 1979 Edition.

Technical Paper: Proc. Instn. Mech. Engrs., pp. 181–196, "The Design and Development of Piston for Automobile Engines," 1964–65, Vo. 179 2.1, No. 6, by J.E. Robinson.

Technical Paper; Mahle Symposium (pp. 3; 77–89), dated May 1973, by H.G. Braendel.

Technical Paper; Associated Engrg. Group Technical Symposium, Paper No. 7 Title: "Oil Cooled & Electron Beam Welded Pistons for Diesel Engs.," dated 1978, by Dr. R. Munro et al.

Technical Paper No. 780781; Society of Automotive Engineers, dated Sep. 11–14, 1978, by M.D. Roehrle.

Technical Paper No. 770031; Society of Automotive Engineers, dated Feb. 28–Mar. 4, 1977, by M.D. Roehrle.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–27 are cancelled.

* * * * *